US 6,399,169 B1

(12) United States Patent
Wang et al.

(10) Patent No.: US 6,399,169 B1
(45) Date of Patent: Jun. 4, 2002

(54) VACUUM IG WINDOW UNIT WITH DUAL PERIPHERAL SEAL

(75) Inventors: Yei-Ping (Mimi) H. Wang, Troy; Vijayen S. Veerasamy, Farmington Hills, both of MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/416,886

(22) Filed: Oct. 13, 1999

Related U.S. Application Data

(63) Continuation-in-part of application No. 09/348,281, filed on Jul. 7, 1999.

(51) Int. Cl.⁷ .............................. E06B 3/24; E04C 2/54
(52) U.S. Cl. ...................... 428/34; 52/786.1; 52/786.13
(58) Field of Search ........................... 428/34, 212, 192; 156/107, 109; 52/786.1, 786.13

(56) References Cited

U.S. PATENT DOCUMENTS

| 49,167 A | 1/1865 | Stetson |
|---|---|---|
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,303,897 A | 12/1942 | Smith |
| 2,962,409 A | 11/1960 | Ludlow et al. |
| 3,441,924 A | 4/1969 | Peek et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 3,990,201 A | 11/1976 | Falbel |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,422,280 A | 12/1983 | Mertin et al. |
| 4,486,482 A | 12/1984 | Kobayashi et al. |
| 4,514,450 A | 4/1985 | Nowobilski et al. |
| 4,683,154 A | 7/1987 | Benson et al. |
| 4,786,344 A | 11/1988 | Beuther |
| 4,822,649 A | 4/1989 | Canaud et al. |
| 4,824,215 A | 4/1989 | Joseph et al. |
| 4,853,264 A | 8/1989 | Vincent et al. |
| 4,874,461 A | 10/1989 | Sato et al. |
| 4,909,875 A | * 3/1990 | Canaud et al. ............... 156/109 |
| 4,924,243 A | 5/1990 | Sato et al. |

(List continued on next page.)

FOREIGN PATENT DOCUMENTS

| EP | 0 870 450 A1 | 10/1998 |
|---|---|---|
| EP | 0831073 | 10/1999 |
| FR | 2 482 161 | 11/1981 |
| GB | 1 328 576 | 8/1973 |
| JP | 11-21150 | 1/1999 |
| JP | 11-79795 | 3/1999 |
| JP | 11-92181 | 4/1999 |
| WO | WO 87/03327 | 6/1987 |

OTHER PUBLICATIONS

"Thermal Outgassing of Vacuum Glazing" by Lenzen, et. al., School of Physics, Univ. of Sydney, NSW 2006, Australia.

(List continued on next page.)

Primary Examiner—Donald J. Loney
(74) Attorney, Agent, or Firm—Nixon & Vanderhye P.C.

(57) ABSTRACT

A vacuum insulating glass (IG) unit and method of making the same. A dual edge seal including at least two separate portions is provided. The inner seal portion is flexible and hermetically seals off the low pressure area between the substrates. The outer seal portion may be less flexible, and protects the inner seal portion and provides for a bonding of the two substrates to one another. The outer seal portion may be formed by reaction injection molding (RIM), extrusion, or any other suitable method in different embodiments.

11 Claims, 5 Drawing Sheets

U.S. PATENT DOCUMENTS

| | | | |
|---|---|---|---|
| 4,928,448 | A | 5/1990 | Phillip |
| 4,983,429 | A | 1/1991 | Takayanagi et al. |
| 5,027,574 | A | 7/1991 | Phillip |
| 5,124,185 | A | 6/1992 | Kerr et al. |
| 5,157,893 | A | 10/1992 | Benson et al. |
| 5,175,975 | A | 1/1993 | Benson et al. |
| 5,234,738 | A | 8/1993 | Wolf |
| 5,247,764 | A | 9/1993 | Jeshurun et al. |
| 5,270,084 | A | 12/1993 | Pakker |
| 5,315,797 | A | 5/1994 | Glover et al. |
| 5,399,406 | A | 3/1995 | Matsuo et al. |
| 5,489,321 | A | 2/1996 | Tracy et al. |
| 5,494,715 | A | 2/1996 | Glover |
| 5,499,128 | A | 3/1996 | Hasegawa et al. |
| 5,596,981 | A | 1/1997 | Soucy |
| 5,657,607 | A | 8/1997 | Collins et al. |
| 5,664,395 | A | 9/1997 | Collins et al. |
| 5,739,882 | A | 4/1998 | Shimizu et al. |
| 5,855,638 | A | 1/1999 | Demars |
| 5,891,536 | A | 4/1999 | Collins et al. |
| 5,902,652 | A | 5/1999 | Collins et al. |
| 6,049,370 | A | 4/2000 | Smith, Jr. et al. |

OTHER PUBLICATIONS

"Temperature–Induced Stresses In Vacuum Glazing: Modelling and Experimental Validation" by Simko, et. al., Solar Energy, vol. 63, No. 1, pp. 1–21, 1998.

"Current Status of the Science and Technology of Vaccum Glazing" by Collins, et. al., Solar Energy, vol. 62, No. 3, pp. 189–213, 1998.

"Fabrication of Evacuated Glazing at Low Temperature" by Griffiths, et. al., Solar Energy, vol. 63, No. 4, pp. 243–249, 1998.

Patent Abstracts of Japan, 11–79795 "Low–Pressure Double Layer Glass and Its Production", Akira.

Patent Abstracts of Japan, 11–21150 "Manufacture of Low –Pressure Double Layer Glass Panel", Hiromii.

Patent Abstracts of Japan, 11–92181 "Reduced Pressure Double Layer Glass and Its Production", Arkira.

PCT International Search Report dated Jan. 31, 2001.

* cited by examiner

VACUUM IG WINDOW UNIT WITH DUAL PERIPHERAL SEAL

This application is a continuation-in-part (CIP) of U.S. application Ser. No. 09/348,281, filed Jul. 7, 1999, the disclosure of which is hereby incorporated herein by reference.

VACUUM IG WINDOW UNIT WITH DUAL PERIPHERAL SEAL

This invention relates to a vacuum insulating glass (IG) unit, and a method of making the same. More particularly, this invention relates to a vacuum IG unit including a dual peripheral seal (i.e. including two or more seal portions).

RELATED APPLICATIONS

Commonly owned U.S. Ser. Nos. 09/303,550 entitled "VACUUM IG PILLAR WITH DLC COATING" filed May 3, 1999, and 09/404,659 filed Sep. 24, 1999 entitled "VACUUM IG WINDOW UNIT WITH PERIPHERAL SEAL AT LEAST PARTIALLY DIFFUSED AT TEMPER", are both hereby incorporated herein by reference.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit. IG unit 1 includes two spaced apart sheets of glass 2 and 3 which enclose an evacuated or low pressure space therebetween. Glass sheets 2 and 3 are interconnected by peripheral or edge seal of rigid fused solder 4 and an array of support pillars 5.

Pump out tube 8 is sealed by solder glass 9 to an aperture or hole 10 which passes from an interior surface of glass sheet 2 to the bottom of recess 11. A vacuum is attached to tube 8 so that the interior cavity between sheets 2 and 3 can be evacuated to create a low pressure area. After evacuation, tube 8 is melted to seal the vacuum. Recess 11 retains melted and sealed tube 8. Chemical getter 12 may optionally be included within machined recess 13.

Conventional vacuum IG units, with their rigid fused solder glass peripheral seals 4, have been manufactured as follows when the upper glass sheet is slightly smaller in dimension than the lower sheet. Solder glass is initially deposited around the periphery of the IG unit in an L-shaped step or corner that is formed by virtue of the upper sheet being slightly smaller in dimension than the lower sheet (not shown in FIGS. 1–2). The entire assembly including sheets 2, 3 and the solder glass seal material is then heated to a temperature of approximately 500° C. at which the solder glass melts, wets the surfaces of the glass sheets, and flows into the space between the sheets forming hermetic peripheral seal 4. High temperatures are maintained for from about one to eight hours (it has recently been found that a time of about eight hours including ramping up/down periods is preferred to properly bond solder glass seal material to the glass substrate(s)).

Unfortunately, 500° C. temperatures and multi-hour periods over which high temperatures are maintained in forming edge seal 4 are undesirable, especially when it is desired to use a tempered glass sheet in the IG unit. Tempered glass loses temper strength upon exposure to high temperatures as a function of heating time as shown in FIGS. 3–4.

FIG. 3 is a graph illustrating how fully thermally tempered plate glass loses original temper upon exposure to different temperatures for different periods of time, where the original center tension stress is 3,200 MU per inch. The X-axis in FIG. 3 is exponentially representative of time in hours (from 1 to 1,000 hours), while the Y-axis is indicative of the percentage (%) of original tempering strength remaining after exposure. FIG. 4 is a graph similar to FIG. 3, except that the X-axis extends from 0 to 1 hour exponentially. Thus, it would be desirable to use as low of temperature as is reasonable in certain embodiments to form edge seal(s) portion(s). Temper strength remaining would be much improved over certain prior art if temperatures of 450 degrees C. or less could be used following thermal tempering of glass substrate(s).

Solder glass peripheral seal 4 may also be undesirable because of its rigid nature (i.e. easy to break, and if one glass sheet breaks the other sheet likely breaks along with it).

It is apparent from the above that there exists a need in the art for a vacuum IG unit, and corresponding method of making the same, where a hermetic seal may be provided between opposing glass sheets without thermally tempered glass sheet(s) of the unit losing more than about 50% of their original temper strength. There also exists a need in the art for a vacuum IG unit including tempered glass sheets, wherein the peripheral seal is formed such that the glass sheets retain more of their original temper strength than with conventional vacuum IG manufacturing techniques. There also exists a need in the art for a more flexible or ductile peripheral seal portion (as compared to solder glass) for a vacuum IG unit. There also exists a need in the art for a vacuum IG unit peripheral seal which can be formed without having to heat the unit to temperatures as high as those used in conventional solder glass seal units. There also exists a need in the art for a simpler method of forming a vacuum IG peripheral seal(s). It is a purpose of this invention to fulfill any and/or all of the above listed needs in the art.

This invention will now be described with respect to certain embodiments thereof, accompanied by certain illustrations.

SUMMARY OF THE INVENTION

An object of this invention is to provide a vacuum insulating glass (IG) unit including a dual peripheral or edge seal.

Another object of this invention is to provide a vacuum IG unit including at least a dual sealing system, wherein a first portion of the seal is flexible and hermetically seals a low pressure space between opposing substrates, and a second portion of the seal is mechanically stronger and less flexible than the first portion of the seal.

Another object of this invention is to form a peripheral seal on a vacuum IG unit by extruding or reaction injection molding (RIM) a polymer-based sealing member onto one or both of the glass substrates (with or without primer therebetween). Such method(s) of seal formation may be more simple than certain prior art methods and/or less costly or time consuming.

Another object of this invention is to provide a vacuum IG unit, wherein thermally tempered glass sheet(s) retain at least about 50% of their original temper strength after formation of the unit.

An object of this invention is to provide an edge or peripheral seal for a vacuum IG unit, wherein the seal does not require processing temperatures greater than about 450° C. other than during tempering.

Another object of this invention is to fulfill any and/or all of the above-listed objects.

Generally speaking, this invention fulfills any or all of the above described needs and/or objects by providing a vacuum insulating glass (IG) window unit comprising:

first and second glass substrates;

an array of spacers disposed between said first and second substrates for spacing said substrates from one another so as to define a space therebetween having a pressure less than atmospheric pressure;

a sealing system for sealing said space between said substrates and for bonding said substrates to one another; and wherein said sealing system includes an inner seal and an outer seal, at least one of said inner seal and said outer seal hermetically sealing said space between said substrates.

This invention further fulfills any or all of the above described needs and/or objects by providing a thermally insulating glass panel comprising:

first and second spaced apart glass substrates defining a low pressure space therebetween having a pressure less than atmospheric pressure;

a plurality of spacers disposed between said first and second glass substrates for spacing said substrates from one another in order to maintain said low pressure space therebetween;

a peripheral seal including at least a flexible inner seal portion and an outer seal portion;

said flexible inner seal portion disposed between said first and second glass substrates for hermetically sealing said low pressure space; and said outer seal portion bonding said first and second glass substrates to one another, and being less flexible than said inner seal portion.

IN THE DRAWINGS

DETAILED DESCRIPTION OF CERTAIN EMBODIMENTS OF THIS INVENTION

Figure 2:
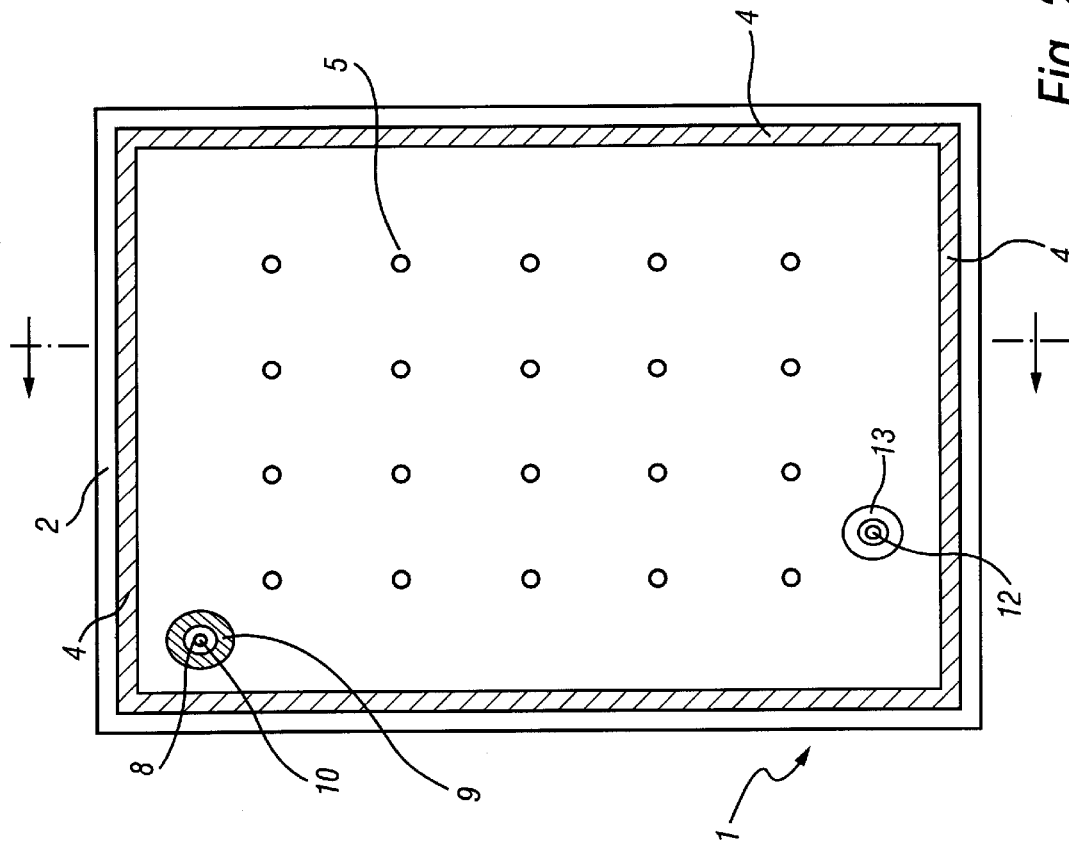
FIG. 2 is a prior art top plan view of the FIG. 1 vacuum IG unit, taken along the section line illustrated in FIG. 1 with the peripheral or edge seal and spacers being shown in cross-section.
Figure 1:
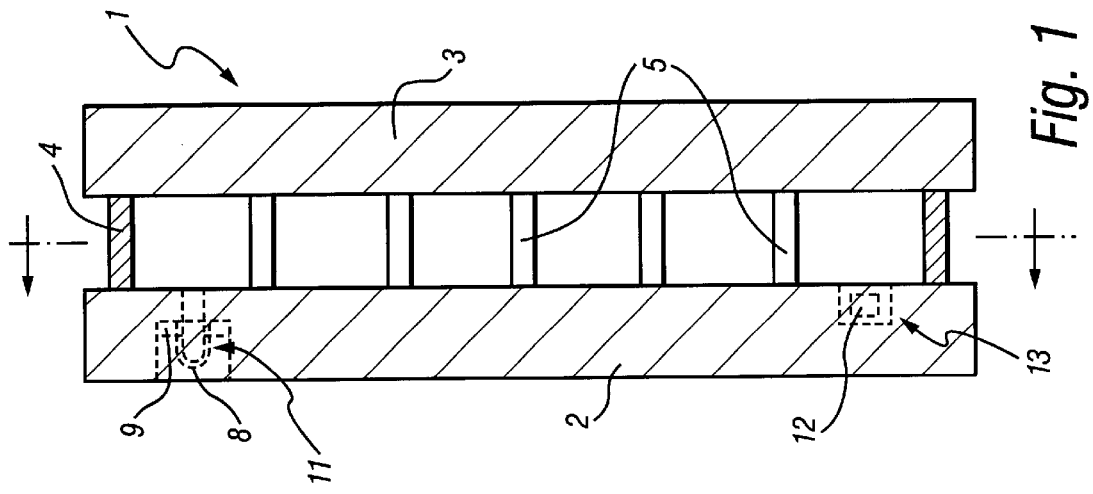
FIG. 1 is a prior art cross-sectional view of a conventional vacuum IG unit.
Figure 3:
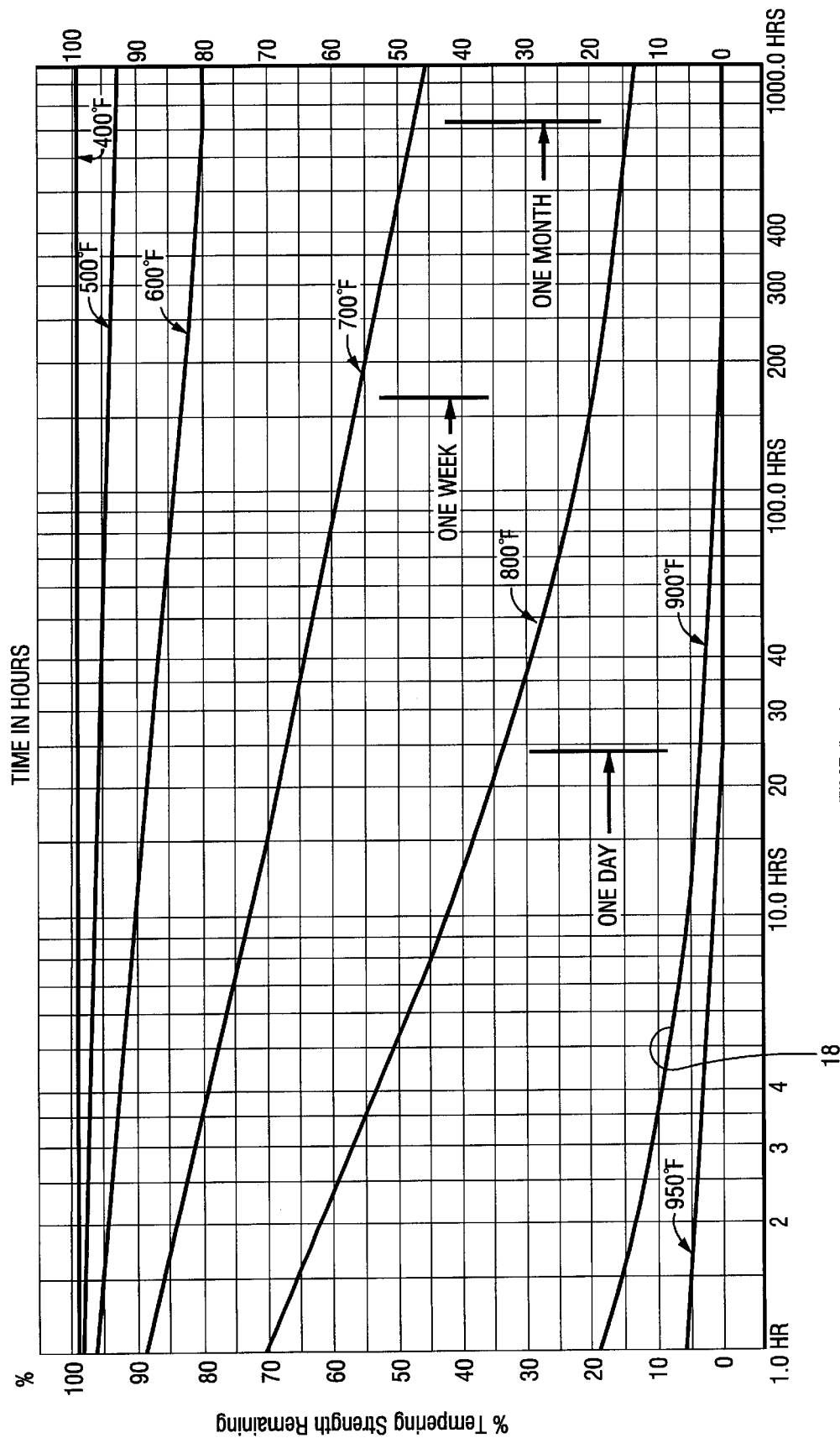
FIG. 3 is a graph correlating known time (hours) vs. percent tempering strength remaining, illustrating the loss of original temper strength for a thermally tempered sheet of glass after exposure to different temperatures for different periods of time.
Figure 4:
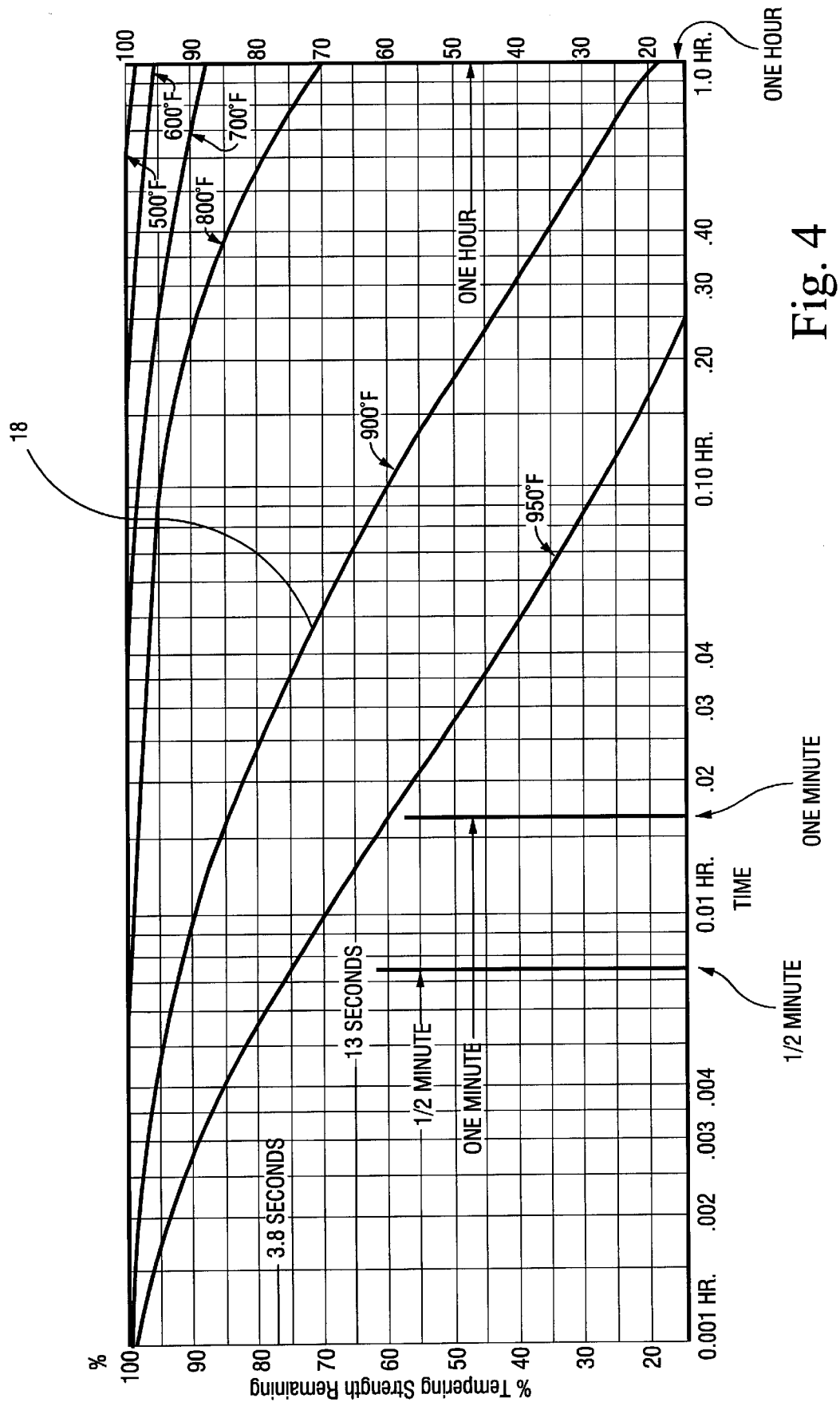
FIG. 4 is graph correlating known time vs. percent tempering strength remaining, illustrating the loss of original temper strength for a thermally tempered sheet of glass after exposure to different temperatures for different periods of time.

Referring now more particularly to the accompanying drawings in which like reference numerals indicate like parts throughout the several views.

Certain embodiments of this invention relate to a peripheral or edge sealing system in a vacuum IG window unit, and/or a method of making the same. The sealing system includes at least two separately formed seal portions or members. "Peripheral" and "edge" seals herein do not mean that the seals are located at the absolute periphery of the unit, but instead mean that the seal is at least partially located at or near (e.g. within about two inches) an edge of at least one substrate of the unit.

Figure 5:
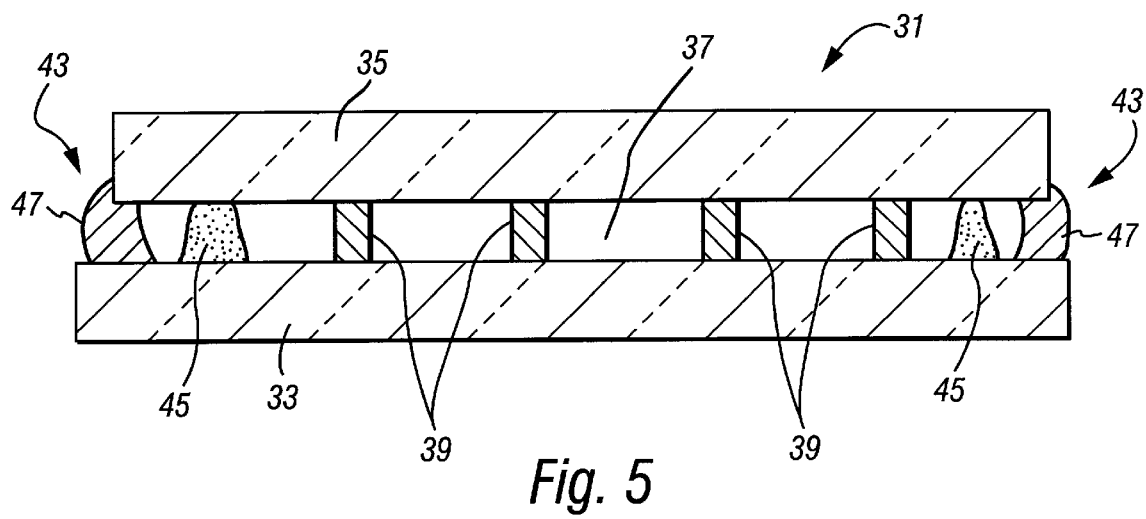
FIG. 5 is a side cross sectional view of a vacuum IG unit according to an embodiment of this invention, including a dual peripheral seal.

FIG. 5 is a cross sectional view of thermally insulating glass panel 31 according to an embodiment of this invention. Because interior space 37 between the opposing substrates is at a pressure lower or less than atmospheric in general, this type of panel is often referred to as a vacuum insulating glass (IG) unit.

Vacuum IG unit or panel 31 includes first glass substrate 33, second glass substrate 35, low pressure or evacuated space 37 between substrates 33 and 35, spacers/pillars 39 for spacing the substrates 33, 35 from one another and supporting them, an optional pump out tube (not shown) disposed in a hole or aperture formed in substrate 33 for evacuating space 37, and peripheral or edge sealing system 43 that hermetically seals low pressure space 37 between substrates 33, 35 and bonds the substrates to one another or holds them together. Sealing system 43 in certain embodiments may be located in approximately the same location as edge seal 4 shown in FIG. 2, i.e. around the periphery of the vacuum IG window unit.

In certain embodiments, sealing system 43 includes both flexible or elastic hermetically sealing inner portion 45 and outer sealing portion 47 that is more rigid and stronger, yet less flexible, than inner portion 45. The material for inner sealing portion 45 may be chosen in certain embodiments so that it has reduced, minimal, or acceptable outgassing under vacuum.

Inner portion 45 forms its seal between the substrates 33, 35 when under compression between the substrates (seal portion 45 need not be an adhesive in certain embodiments). In certain embodiments, flexible or elastic inner seal portion 45 requires lower processing temperatures than conventional solder glass. Flexible seal portion 45 functions to maintain the vacuum in space 37 by providing a hermetic seal, while substantially rigid outer seal portion 47 is provided to protect seal portion 45 and to mechanically adhere or bond opposing substrates 33, 35 to one another. Flexible hermetic seal portion 45 need not have a bonding strength sufficient to adequately bond the substrates 33, 35 together (outer portion 47 serves this purpose). Likewise, outer seal portion 47 need not be of a hermetic or flexible type (inner portion 45 provides the hermetic aspect of the overall edge seal 43).

Vacuum IG units 31 according to different embodiments of this invention may be used as residential or commercial windows. The evacuation of space 37 eliminates or reduces heat transport between glass substrates 33 and 35 due to gaseous conduction and convection. In addition, radiative heat transport between glass sheets 33 and 35 can be reduced to a low level by providing a low emittance (low-E) coating (s) on the internal surface of one or both of sheets 33, 35. High levels of thermal insulation can thus be achieved. Low gaseous thermal conduction may be achieved when the pressure in space 37 is reduced to a level equal to or below about 0.5×10⁻³ Torr, more preferably below about 0.1 mTorr, or 10⁻⁴ Torr, and most preferably below about 10⁻⁶ Torr of atmospheric pressure. Flexible inner portion 45 of seal 43 eliminates any ingress or outgress of gas or air to/from space 37.

When inner seal portion 45 is compressed between the substrates 33, 35, it hermetically seals off space 37. Seal portion 45's flexibility allows it to expand and/or contract with movement (e.g. due to temperature changes) of substrate(s) 33 and/or 35 thereby improving its ability to hermetically seal. Seal portion 45 is substantially compressible.

In certain embodiments of this invention, flexible hermetic inner seal portion 45 of seal 43 in the FIG. 5 embodiment may be made of or include any of the following materials: Ostalloy 313-4, 99% indium (In) wire available from Arconium (Providence, R.I.), copper (Cu) wire, nickel (Ni) wire, Teflon (trademark), liquid glass (i.e. glass composition with water in it when applied, wherein the water evaporates when heated to form the inner seal portion 45), rubber, silicone rubber, butyl rubber, Indalloy No. 53 available from Indium Corp. in paste or wire form having a composition of 67% Bi and 33% In (% by weight), Indalloy No. 1 from Indium Corp. in paste or wire form having a composition of 50% In and 50% Sn, Indalloy No. 290 available from Indium Corp. in paste or wire form having a composition of 97% In and 3% Ag, Indalloy No. 9 from Indium Corp. in paste or wire form having a composition of 70% Sn, 18% Pb and 12% In, Indalloy No. 281 available from Indium Corp. in paste or wire form having a composition of 58% Bi and 42% Sn, Indalloy No. 206 available from Indium Corp. in paste or wire form having a composition of 60% Pb and 40% In, Indalloy No. 227 available from Indium Corp. in paste or wire form having a composition of 77.2% Sn, 20% In and 2.8% Ag, Indalloy No. 2 available from Indium Corp. in paste or wire form having a composition of 80% In, 15% Pb and 5% Ag, Indalloy No. 3 available from Indium Corp. in paste or wire form having a composition of 90% In and 10% Ag, or any other suitable flexible organic or inorganic material. In certain embodiments, inner seal portion 45 and pillars 39 may be made or of include the same flexible material. In certain embodiments herein, the material for the inner seal may have a tensile strength less than about 6800 PSI.

In certain embodiments, flexible inner seal portion 45 may be of a material having a hardness (Brinell scale) of less than about 5.0, and most preferably from about 0.25 to 2.0. Conventional fused solder glass edge seals have a hardness higher than the hardness of inner seal material 45. Inner seal portion 45 in certain embodiments has an elongation characteristic of at least about 10%, preferably from about 10–40%, and most preferably from about 20–30% (i.e. how far it may stretch).

It is noted that in most embodiments herein, the material for inner seal portion 45 is heated after its application in order to cause it to cure and form the hermetic seal between the glass substrates. Exemplary heating temperatures and/or times are disclosed in the parent application, incorporated herein by reference.

In certain embodiments of this invention, mechanical or outer seal portion 47 of seal 43 in the FIG. 5 embodiment may be made of or include any of the following generally rigid adhesive/bonding materials: Loctite 3494 acrylic adhesive (available from Loctite Corp., Hartford, Conn.), Loctite 3335 epoxy-based adhesive, solder glass, or any suitable polymer material. Different thermoplastic or thermoset materials may also be used as outer seal portion 47 (primer (s) may or may not be used in different embodiments). In certain embodiments, outer seal portion 47 may be formed of or include a material encapsulating the edges of one or both of the glass substrates (such encapsulation may be formed by reaction injection molding (RIM), injection molding, extrusion, or the like). When the outer seal is formed by RIM or extrusion, material 47 may be of or include polyurethane, urethane adhesive, and/or any other suitable polymer-based material which may be extruded or reaction injection molded. In certain embodiments, getter material may be provided on or within outer seal portion 47.

Still referring to FIG. 5, an array of small, support spacers or pillars 39 is provided between substrates 33 and 35 in order to maintain separation of the two approximately parallel glass sheets against atmospheric pressure. It is often desirable for pillars 39 to be sufficiently small so that they are visibly unobtrusive. In certain embodiments, each pillar may have a height of from about 0.10 to 0.30 mm. Pillars may be made of or include solder glass, ceramic, metal, or the same flexible material constituting inner seal portion 45 in different embodiments of this invention. These spacers or pillars 39 may take the form of any number of geometric shapes. For example, spacers or pillars 39 may be spherical, cylindrical, square, rectangular, oval, trapezoidal, or the like.

Tempered glass 33 and/or 35 is valued for its mechanical and thermal strength. Tempered glass has been used traditionally in commercial applications where wind, snow or thermal loads exceed the strength capabilities of other glass and/or where tempered glass is mandated by code (e.g. safety glazing for entranceways, railings, or fire knockout windows). In certain preferred embodiments of this invention, glass sheets 33 and 35 are thermally or heat tempered. By providing tempered glass sheets as substrates 33 and 35, the strength of the glass sheets is increased. This allows pillars to be spaced further apart, which increases stresses at the glass/pillar interface(s) but potentially results in less pillars being utilized in the vacuum IG unit. Reduction in the number of pillars may enhance the thermal insulation properties of vacuum IG unit 31. In preferred embodiments of this invention, the glass sheets are thermally tempered prior to the step of sandwiching the pillars therebetween. However, in alternative embodiments, the glass substrates 35, 35 need not be tempered.

Figure 6:
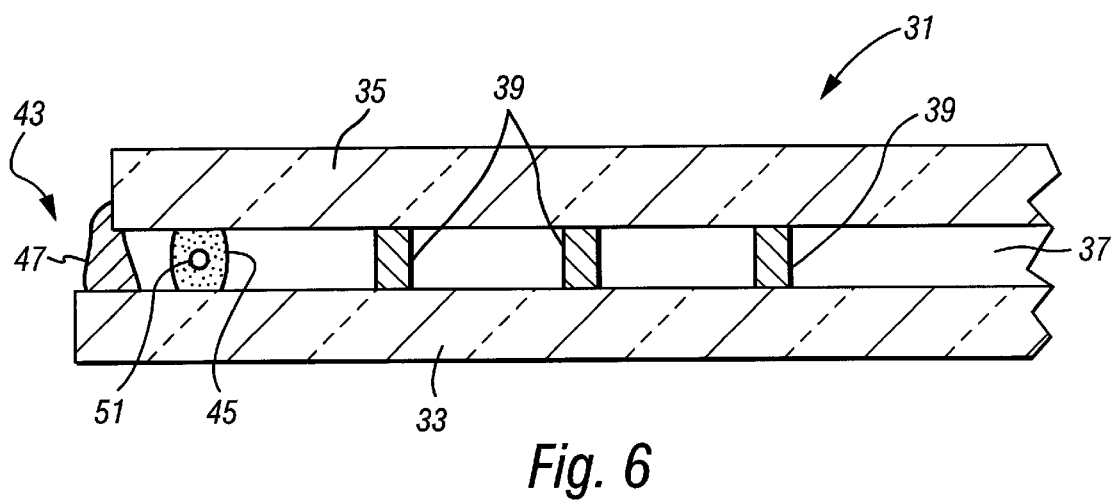
FIG. 6 is a side partial cross sectional view of a vacuum IG unit according to another embodiment of this invention, including a dual peripheral seal.

The FIG. 6 embodiment is similar to that of FIG. 5, except for flexible inner seal portion 45. In the FIG. 6 embodiment, inner seal portion 45 is formed by coextrusion so as to include any type of metallic wire 51 therein. Wire 51 is preferably flexible, but need not be in all embodiments. Following coextrusion, the sealing member is positioned between the substrates and the substrates pressed toward one another to compress seal portion 45 therebetween. Wire 51 may include aluminum wire, copper wire, indium wire, or the like in exemplary embodiments. Wire 51 is at least partially (preferably entirely) surrounded by any of the flexible materials listed above which may make up seal portion 45 in the FIG. 5 embodiment. The coextrusion of seal portion 45 in the FIG. 6 embodiment enables the inner seal member to be more easily positioned between the substrates at the location where hermetic sealing is desired. This provides for flexible hermetic seal portion 45 in the FIG. 6 embodiment.

Figure 7:
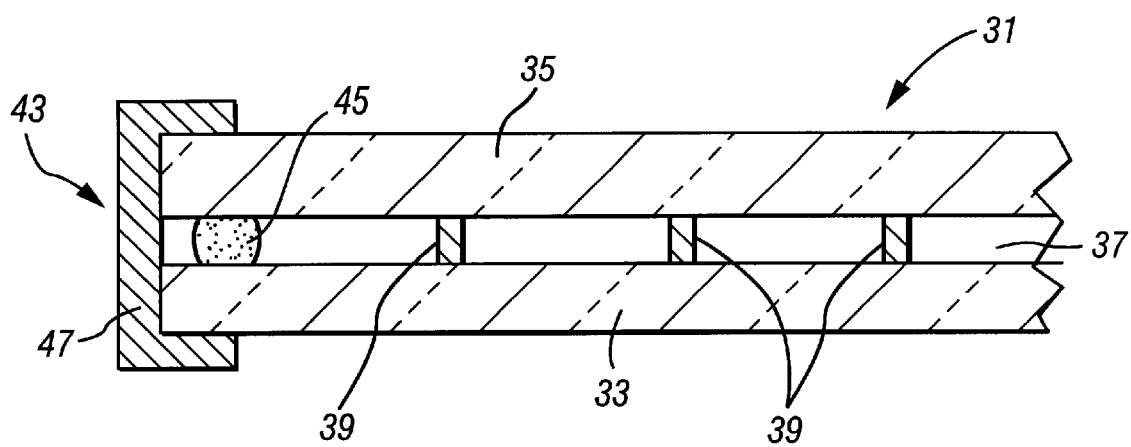
FIG. 7 is a side partial cross sectional view of a vacuum IG unit according to another embodiment of this invention, including a dual peripheral seal.

The FIG. 7 embodiment is similar to that of FIG. 5, except for outer seal 47. In the FIG. 7 embodiment, outer sealing portion 47 includes an approximately C-shaped brace, clamping, or encapsulating type structure which holds substrates 33 and 35 together. This outer seal is provided so as to contact outer major surfaces of substrates 33, 35. This outer seal may be metallic, plastic, or polymeric-based in different embodiments. In alternative embodiments, the outer seals of FIGS. 5 and 7 may be used together in combination along with an inner hermetic seal 45.

In a variation of the FIG. 7 embodiment, reaction injection molding (RIM), injection molding or extrusion may be used to form an approximately C-shaped encapsulating flexible or non-flexible outer seal portion 47 that encapsulates the outer edges of one or both substrates 33, 35 in order to hold the substrates together. Suitable polymer-based thermoplastic or thermoset materials may be used to form such an encapsulating outer seal portion, with conventional extrusion and/or RIM techniques being used. In preferred embodiments, outer seal 47 is formed by RIM or extrusion after formation of inner seal 45. However, in alternative embodiments, a single edge seal may be formed using RIM or extrusion techniques (the inner seal may not be needed).

Figure 8:
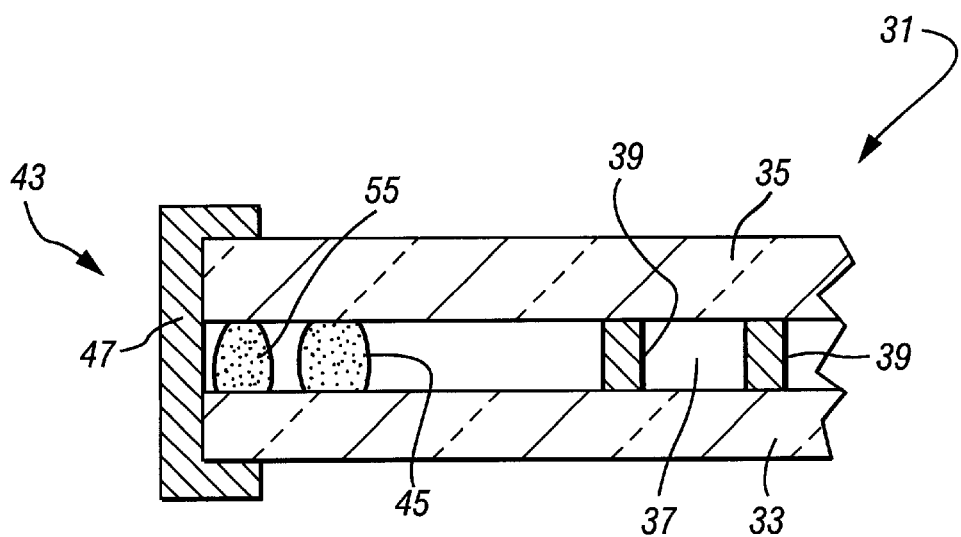
FIG. 8 is a side partial cross sectional view of a vacuum IG unit according to another embodiment of this invention, including a sealing system with three separately formed seals.

The FIG. 8 embodiment is similar to that of FIG. 7, except for the additional provision of flexible intermediate seal 55. Intermediate seal 55 of sealing system 43 is disposed between inner seal 45 and outer seal 47. This embodiment is useful in situations where the flexible seal 55 is of a material (e.g. rubber) susceptible to outgassing. In such cases, it is desirable to insulate this flexible material from low pressure space 37 by using inner seal 45, while intermediate seal 55 provides superior hermetic sealing functionality to maintain the vacuum in space 37. Inner seal 45 in this embodiment may or may not be flexible, because the hermetic sealing function is provided by flexible intermediate seal 55. Inner seal 45 may be of any material discussed herein suitable for a flexible inner seal, but may also be of a more rigid material such as solder glass. Again, outer seal 47 functions to bond the two substrates 33, 35 to one another.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A thermally insulating glass panel comprising:
   first and second spaced apart glass substrates defining a low pressure space therebetween having a pressure less than atmospheric pressure;
   a plurality of spacers disposed between said first and second glass substrates for spacing said substrates from one another in order to maintain said low pressure space therebetween;
   a peripheral seal including at least a flexible inner seal portion and an outer seal portion;
   said flexible inner seal portion disposed between said first and second glass substrates for hermetically sealing said low pressure space; and
   said outer seal portion comprising solder glass and bonding said first and second glass substrates to one another, and being less flexible than said inner seal portion.

2. The glass panel of claim 1, wherein said flexible inner seal portion hermetically seals said low pressure space when said inner seal portion is under compression between said first and second glass substrates.

3. The glass panel of claim 2, wherein a space is defined between said inner and outer seal portions.

4. The glass panel of claim 1, wherein said flexible inner seal portion includes a wire encapsulated within a surrounding flexible material.

5. The glass panel of claim 4, wherein said wire and surrounding flexible material are formed by coextrusion.

6. The glass panel of claim 1, wherein said inner seal portion is made of or includes at least one of: butyl rubber, copper, nickel, Teflon, silicone rubber, and indium.

7. The glass panel of claim 6, wherein said inner seal portion includes rubber.

8. The glass panel of claim 1, wherein said inner seal portion has an elongation characteristic of at least about 10%.

9. The glass panel of claim 1, wherein said inner seal portion has a hardness (Brinell scale) of less than about 5.0.

10. A thermally insulating glass panel comprising:
    first and second spaced apart glass substrates defining a low pressure space therebetween having a pressure less than atmospheric pressure;
    a plurality of spacers disposed between said first and second glass substrates for spacing said substrates from one another in order to maintain said low pressure space therebetween;
    a peripheral seal including at least a flexible inner seal portion and an outer seal portion;
    said flexible inner seal portion disposed between said first and second glass substrates for hermetically sealing said low pressure space;
    said outer seal portion bonding said first and second glass substrates to one another, and being less flexible than said inner seal portion; and
    wherein said peripheral seal further includes an intermediate seal portion disposed between said inner and outer seal portions.

11. The glass panel of claim 10, wherein said intermediate seal portion includes flexible rubber for forming a hermetic seal.

* * * * *